United States Patent [19]

Onishi et al.

[11] Patent Number: 4,670,282

[45] Date of Patent: Jun. 2, 1987

[54] METHOD FOR COOKING RICE

[75] Inventors: Masayuki Onishi, Nagoya; Kenzo Ito, Kuwana; Morio Asahi, Gifu, all of Japan

[73] Assignee: Tokyo Shibaura Electric Co., Ltd., Kawasaki, Japan

[21] Appl. No.: 646,220

[22] Filed: Aug. 31, 1984

Related U.S. Application Data

[60] Division of Ser. No. 300,996, Sep. 10, 1981, abandoned, which is a continuation of Ser. No. 97,894, Nov. 26, 1979, abandoned, which is a continuation of Ser. No. 897,548, Apr. 18, 1978, abandoned.

[30] Foreign Application Priority Data

Apr. 21, 1977 [JP] Japan ................................. 52-45999
May 12, 1977 [JP] Japan ................................. 52-54710

[51] Int. Cl.$^4$ ............................................. A23L 1/01
[52] U.S. Cl. ................................... 426/508; 219/441; 426/523
[58] Field of Search ............... 426/508, 523, 232, 233; 219/441, 442; 99/403, 415

[56] References Cited

U.S. PATENT DOCUMENTS 2,952,764  9/1960  Minami ............................... 426/232
3,551,644  12/1970  Sano et al. ......................... 219/441
3,584,196  6/1971  Kurokawa et al. .................. 219/441

Primary Examiner—George Yeung
Attorney, Agent, or Firm—Cushman, Darby & Cushman

[57] ABSTRACT

Disclosed is an electric rice cooker which comprises a pot to hold rice and water, an inner case defining a heating space between the inner case and the outer peripheral and bottom surfaces of the pot, an outer case supporting the inner case, and at least one heater disposed in the heating space at a fixed distance from each of the pot and the inner case for heating air in the heating space to circulate the same by convection, thereby heating the pot and the rice and water in the pot from the upper portion.

3 Claims, 8 Drawing Figures

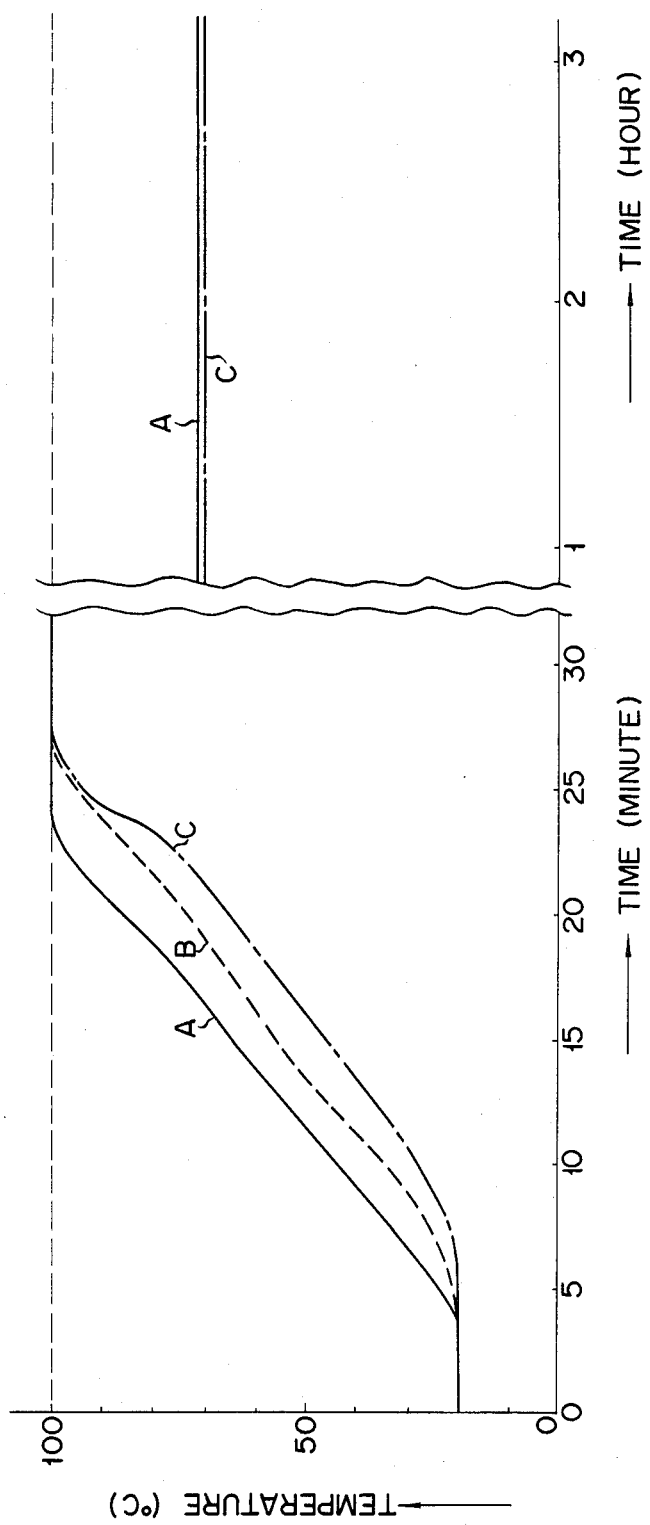

METHOD FOR COOKING RICE

This is a division of application Ser. No. 300,996, filed Sept. 10, 1981, now abandoned, which is a continuation of Ser. No. 97,894 filed Nov. 26, 1979, now abandoned, which is in turn a continuation of Ser. No. 897,548, filed Apr. 18, 1978, now abandoned.

This invention relates to an electric rice cooker capable of boiling cooking materials contained in a pot by means of heat generated by an electric heater.

Heretofore, various types of electric rice cookers have been used. In such electric rice cookers, a pot containing cooking materials or rice and water is usually placed directly on a hot plate heated by an electric heater, and the rice is cooked by means of heat produced from the bottom portion of the pot. These rice cookers, however, are subject to a defect in that the condition of boiled rice may be uneven. That is, the upper portion of the boiled rice is liable to become relatively dry and crisp, while the lower portion may become relatively wet and pasty.

Moreover, the conventional electric rice cooker requires that sufficient heat be conducted to the pot by bringing the pot in close contact to the hot plate. This would require high-precision processing of the contact surfaces of the pot and hot plate or some measure to counter uneven or poor heat conduction due to deformation or corrosion of the contact portion, which might be one of the causes for the increased cost of production.

An object of this invention is to provide an electric rice cooker free from the aforesaid defects to which the prior art rice cookers have been subject, capable of production involving no precision processing and so constructed as to ensure substantially uniform cooking of rice contained in a pot.

In order to attain the above object, the electric rice cooker of the invention comprises a pot to hold cooking materials or rice an water, and inner case containing and supporting the pot and defining a continuous heating space between the inner case and the outer peripheral and bottom surfaces of the pot, an outer case supporting the inner case, and at least one electric heater disposed in the heating space at fixed distances from the pot and inner case for heating air in the heating space to circulate the air by convection, thereby heating the pot and the cooking materials in the pot.

In the electric rice cooker of the invention with the aforesaid construction, the heating space surrounding the outer peripheral and bottom portions of the pot holding the cooking materials is heated by the electric heater, and the temperature of the pot is increased from the upper to lower portions by means of convection caused in the heating space by the heated air, thereby gradually attaining the same temperature level throughout the pot.

Since the above-mentioned electric rice cooker, unlike the prior art rice cookers, is not such that the pot is heated in close contact with a hot plate having a heater, it will not require any precision processing for forming the aforesaid contact portion, substantially facilitating assembly and maintenance and reducing the cost of production.

Further, according to the electric rice cooker of the invention, the pot, and hence the rice and water contained therein, may be heated from the upper to lower portions, so that the whole portion of the rice in the pot may uniformly absorb the water, thus eliminating the unevenness in the condition of boiled rice and securing uniformly tasty rice throughout the pot.

According to a preferred embodiment of this invention, the electric rice cooker with the above-mentioned construction is provided with a circuit breaker means to operate when the pot is subjected to "dried-up boiling". In the electric rice cooker with such circuit breaker means, the circuit breaker means operates automatically to de-energize the heater when the rice has been cooked and the pot has got to the dried-up boiling, thereby completely finishing the rice cooking operation.

Furthermore, by connecting the circuit breaker means, such as a switch, in parallel with a series circuit of a temperature sensing means, such as a bimetal switch, to open when the temperature of the pot has exceeded a level at which the pot is to be kept and a power limiting means, such as a diode for half-wave rectification, the electric rice cooker may be automatically rendered ready to start the "keeping warm" operation when the rice cooking has been completed and the circuit breaker means has operated to open thus keeping the warmth of the pot and the boiled rice therein.

This invention can be more fully understood from the following detailed description when taken in conjunction with the accompanying drawings, in which:

FIG. 8 shows curves illustrating rises in temperature at fixed points in the electric rice cooker of FIG. 6, as well as the temperature conditions in the keeping-warm state.

Figure 1:
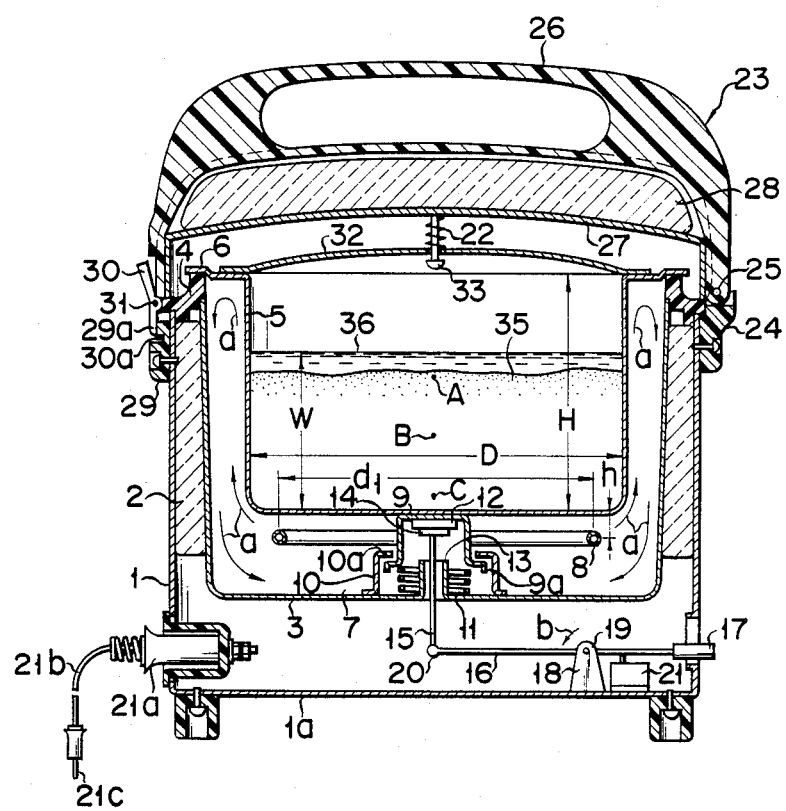
FIG. 1 is a sectional view of an electric rice cooker according to an embodiment of this invention.

Now there will be described an embodiment of this invention. Referring to FIG. 1, there are shown a substantially bottomed-cylindrical outer case 1 with an open top and a substantially bottomed-cylindrical inner case 3 as a pot container disposed inside the outer case 1 with an adiabatic material. The outer periphery of the top edge of the inner case 3 is fitted in a ring frame 4 formed of e.g. heat resisting plastic which in turn is fitted in the inner periphery of the top edge of the outer case 1. Numeral 5 designates a pot with a flange 6 outwardly extending from the edge of the top opening, the pot 5 being disposed inside the inner case 3 by placing the flange 6 on the top face of the frame 4. The pot 5 is so designed that its height H and outside diameter D are smaller than those of the inner case 3, respectively, so that a heating space 7 enclosed by the inner case 3 is defined around the pot 5, continuously surrounding the outer bottom and lateral faces of the pot 5. The distance between the outer peripheral surface of the pot 5 and the inner peripheral surface of the inner case 3 is shorter than that between the outer bottom face of the pot 5 and the inner bottom face of the inner case 3. Numeral 8 designates a substantially ring-shaped sheath heater with a capacity of e.g. 600 W which is supported in the heating space by means of a support member (not shown) at a distance h from the outer bottom face of the pot 5, having a diameter $d_1$ somewhat smaller than the outside diameter D of the pot 5. Numeral 9 designates a bottomed-cylindrical protective case with an open lower end which is vertically movably guided and supported by a guide sleeve 10 mounted on the inside bottom of the inner case 3, and is always upwardly urged by means of a compression coil spring 11 disposed between a collar portion 9a formed on the bottom edge of the protective case 9 and the inner case 3. Therefore, the top face of the protective case 9 is pressed against the bottom face of the pot 5. An inwardly bent collar portion 10a is formed on the top edge of the guide sleeve 10 so that the collar portion 9a will engage the collar portion 10a of the guide sleeve 10 to be prevented from coming out when the pot 5 is removed from the inner case 3. Numeral 12 designates a magnetic member which is stuck to the inside top face of the protective case 9 and formed of a magnetic shunt material having a magnetic transformation point. A sliding shaft 15 fixed at the top end by a permanent magnet 14 is vertically movably passed through a guide sleeve 13 formed substantially in the center of the inside bottom of the inner case 3. The middle portion of a lever 16 having a knob 17 at one end thereof is rockably supported by a support arm 18 erected on a base plate 1a of the outer case 1 through a pin 19, the other end of the lever 16 being rockably coupled with the bottom end portion of the sliding shaft 15 by means of a pin 20. The knob 17 on the lever 16 protrudes outward from the lateral face of the outer case 1, while the lever 16 is always urged in the direction of arrow b by a spring (not shown). A microswitch 21 is a circuit breaker means fixed to the base plate 1a of the outer case 1 on one end side of the lever 16. When the lever 16 is pushed down to cause the permanent magnet 14 to be attracted to the magnetic member 12, the microswitch 21 is closed and the sheath heater 8 is energized. Numeral 21a designates a plug and a socket for connecting the electric rice cooker to the power source. At operation an attachment plug 21c at the other end of a cord 21b is inserted in an outlet of the power source, and the heater 8 is heated by operating the microswitch 21. Wiring is omitted for the simplicity of the drawing. Numeral 23 designates an outer lid formed of e.g. plastic which is rockably supported by means of a pin 25 on a hinge member 24 screwed to the top edge portion of the outer case 1, a grip portion 26 for carrying being integrally formed on top of the outer lid 23. An inside cover 27 is fixed to the inside of the outer lid 23 with an adiabatic material 28. Numeral 29 designates an engaging member located on the side opposite to the hinge member 24 and screwed to the top edge portion of the outer case 1, an engaging lever 30 being rockably supported by means of a pin 31 on the outer lid 23 at a position facing the engaging member 29. An engaging portion 30a at the tip end of the engaging lever 30 is so designed as to engage an engaging portion 29a of the engaging member 29 when the outer lid 23 is shut down, while the engaging lever 30 is urged by a spring (not shown) so as to rock in a direction to allow the engaging portion 30a to engage the engaging portion 29a. Numeral 32 designates an inner lid which is vertically movably supported by a support pin 33 protruding from the under surface of the inside cover 27 and is always downwardly urged by a coil spring 22. Thus, when the outer lid 23 is put on, the inner lid 32 is pressed against the flange 6 of the pot 5 to cover the pot 5.

Now there will be described the operation of this embodiment with the above-mentioned construction. Rice 35 washed in water and a quantity of water 36 required for cooking the rice 35 are put in the pot 5, the pot 5 is put in the inner case 3 with the flange placed on the frame 4, and then the outer lid 23 is rocked in the shutting direction to engage the engaging portion 30a of the engaging lever 30 with the engaging portion 29a of the engaging member 29, thereby pressing the inner lid 32 against the top face of the pot 5 and covering the pot 5. Subsequently, when the knob 17 is pushed down to rock the lever 16 and move the sliding shaft 15 upward, thereby causing the permanent magnet 14 to be attracted to the magnetic member 12, the microswitch 21 is closed and the sheath heater 8 is energized. When the sheath heater 8 is heated, air in the enclosed heating space 7 is heated to cause convection as indicated by arrow a in FIG. 1, and the pot 5 is heated by means of the heated air, thus performing the cooking of the rice held in the pot 5. When the water 36 in the pot 5 is entirely absorbed by the rice 35, the pot 5 is subjected to, so to speak, "dried-up boiling" and the temperature at the bottom portion of the pot 5 rises drastically, raising the temperatures of the magnetic member 12 and permanent magnet 14 through the protective case 9. When the temperatures of the magnetic member 12 and permanent magnet 14 are raised, the attraction between the magnetic member 12 and the permanent magnet 14 is reduced mainly because of the sudden reduction in the permeability of the magnetic member 12 formed of magnetic shunt steel. When such attraction is reduced below a fixed level, it is exceeded by a force to pull the sliding shaft 15 downward by means of the weight of the sliding shaft 15 itself plus a rocking force applied in the direction of arrow b to the lever 16 by the aforesaid spring (not shown), whereby the permanent magnet 14 is shifted downward, falling apart from the magnetic member 12. By such shifting, the lever 16 rocks in the direction of arrow b to return the knob 17 upward, the microswitch 21 is opened, and the sheath heater 8 is de-energized.

Figure 2:
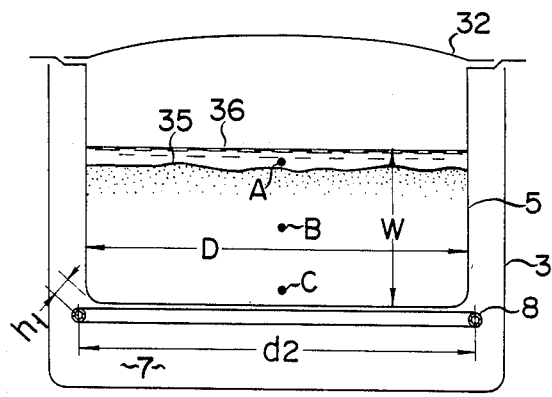
FIGS. 2 and 3 are diagrams showing varied arrangements of each different type of sheath heater used with the electric rice cooker as shown in FIG. 1.
Figure 3:
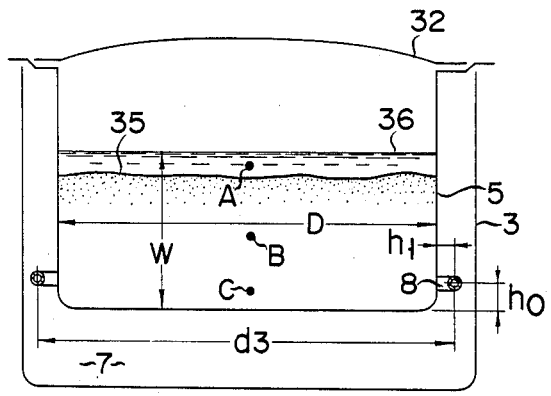
Figure 4:
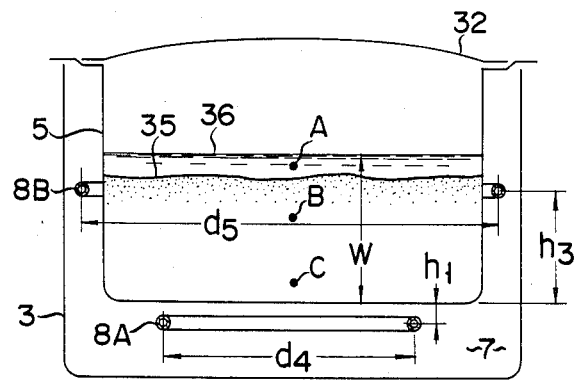
FIG. 4 is a diagram showing two sheath heaters disposed in a heating space of the electric rice cooker of FIG. 1.
Figure 5:
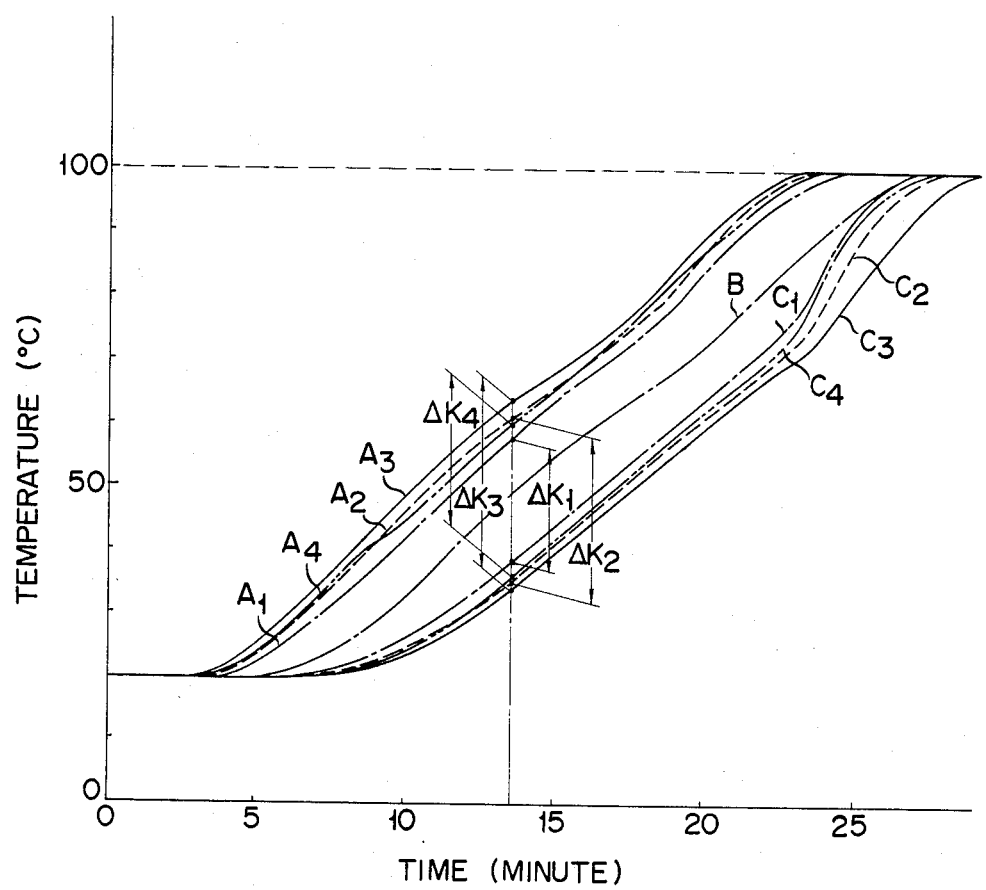
FIG. 5 show curves illustrating rises in temperature at fixed points in the electric rice cooker shown in FIGS. 1, 2, 3 and 4.

Meanwhile, the inventors conducted tests for cases where the sheath heater 8 is so located as shown in FIGS. 2 and 3 and where two sheath heaters 8A and 8B with a capacity of 300 W are provided as shown in FIG. 4, besides the case where the sheath heater 8 is so located as shown in FIG. 1, and obtained the test results as shown in FIG. 5. In FIGS. 1 to 4, the pot 5 has a diameter D=190 mm, height H=140 mm, and a distance $h_1$=10 mm. The sheath heaters 8 as shown in FIGS. 1, 2 and 3 have their respective diameters $d_1$=150 mm, $d_2$=200 mm and $d_3$=210 mm, the sheath heater 8 of FIG. 3 being located above the bottom face of the pot 5 by a length $h_0$=20 mm. Further, in FIG. 4, the sheath heater 8A has a diameter $d_4$=100 mm, while the sheath heater 8B has a diameter $d_5$=210 mm, located above the bottom face of the pot 5 by a length $h_3$=70 mm. In the drawing of FIG. 5, the temperature t (° C.) and time T (minute) are represented by the axes of ordinate and abscissa respectively. The curves of FIG. 5 shows measurement results for temperatures at an upper portion (center point 10 mm below the water level, indicated by A in each drawing), a lower portion (center point 10 mm above the inner bottom face of the pot 5, indicated by C in each drawing), and an intermediate portion (intermediate point between A and C, indicated by B in each drawing) of the rice 35 as measured when 1.4 liter of rice was cooked (in this case, the volume of water plus rice is 2,300 cc and the water level W is about 85 mm). In FIG. 5, $A_1$, B and $C_1$ indicate the temperature changes at points A, B and C, respectively, when the rice is cooled in the state of FIG. 1, while $A_2$, $A_3$ and $A_4$ indicate the temperature changes at point A (upper portion) as in FIGS. 2, 3 and 4, respectively, and $C_2$, $C_3$ and $C_4$ indicate the temperature changes at point C (lower portion) as in FIGS. 2, 3 and 4, respectively. The temperature changes at point B (intermediate portion) as in FIGS. 2 to 4 are excluded from the illustration for simplicity because they are substantially equivalent to the temperature change B at point B as in FIG. 1.

In this embodiment, the heating space 7 is so defined as continuously to surround the outer bottom and lateral faces of the pot 5, and the sheath heater 8 or heaters 8A and 8B are disposed in the heating space 7 at fixed distances from the pot 5 and the inner case 3. Therefore, also in the constructions as shown in FIGS. 2 to 4, the circulation of air by convection as indicated by arrow a in FIG. 1 may be achieved relatively satisfactorily to raise the temperature at the upper portion preferentially, thus increasing the temperatures $A_1$, $A_2$, $A_3$ and $A_4$ at the upper portion A of the rice 35 prior to the temperature B at the intermediate portion B as well as to the temperatures $C_1$, $C_2$, $C_3$ and $C_4$ at th lower portion C. For example, the differences between the temperatures at point A and those at point C after approximately 13 minutes of cooking may be $A_1-C_1=\Delta K_1=20$ (° C.), $A_2-C_2=\Delta K_2=25$ (° C.), $A_3-C_3=\Delta K_3=80$ (° C.), and $A_4-C_4=\Delta K_4=23$ (° C.), respectively.

The water absorptivity of the rice is highest when at temperatures ranging from 60° C. to 70° C. or optimum temperature range for water absorption. When the temperature of the upper portion A of the rice 35 reaches the range of 60° C. to 70° C. prior to the intermediate and lower portions B and C, such upper portion A of the rice 35 first begins to absorb the water. In the meantime, the water level is lowered as the water 36 in the pot 5 is absorbed by the rice 35 with the passage of the cooking time, automatically preventing excessive water absorption by the rice 35 located at the portion A. Then, as the temperature of the intermediate portion B increases to reach the range of 60° C. to 70° C. following the upper portion A, there prevails water absorption by the rice 35 located at such intermediate portion B. When the water absorption by the intermediate portion B of the rice 35 has progressed with the lapse of time, the water level in the pot 5 is further lowered in the aforesaid manner, preventing excessive water absorption by the rice 35 located at the intermediate portion B. Thereafter is activated water absorption by the lower portion C of the rice 35 whose temperature increases following the intermediate portion B.

Thus, according to this embodiment, the inner case 3 defines around the outer periphery of the pot 5 the enclosed heating space 7 continuously facing from the outer bottom to lateral faces of the pot 5, and the sheath heater 8 or heaters 8A and 8B are disposed in the heating space 7 at a fixed distance or distances from the pot 5, the pot 5 being heated by the sheath heater 8 or heaters 8A and 8B through the air in the heating space 7. Therefore, the temperature at the upper portion of the heating space 7 increases earlier than that at the lower portion due to the effect of convection, while, as regards the temperature distribution in the pot 5, the temperature is highest at the upper portion A, reducing toward the intermediate and lower portions B and C. Consequently, the optimum temperature for water absorption (60° C. to 70° C.) is reached at the earlier stage of the rice cooking by the upper portion A of the rice 35 where the water 36 is first used up to lower the water level in the pot 5 with the progress of the rice cooking, while it is reached at the end of the cooking process by the lower portion C of the rice 35 where the water 36 remains to the last. Thus, the upper portion of the pot 5 quickly reaches the optimum water absorption temperature but quickly absorbs the water 36, while the lower portion of the pot 5 may hold the water nearly to the end of the cooking process but is slow to reach the optimum temperature for water absorption. Accordingly, the rice 35 in the pot 5 absorbs the water substantially for a fixed period without respect to the upper, intermediate, and lower portions A, B and C, so that the whole lot of the rice 35 may be boiled, absorbing water at a uniform water absorptivity. Moreover, the rice 35 located at the upper and intermediate portions A and B function as a heat insulating layer at the last stage of the rice cooking, so that the lower portion C of the rice 35 can drastically increase in temperature, requiring no prolonged cooking time.

According to this invention, as stated above, the rice 35 in the pot 5 is boiled under a uniform water-absorptive condition, so that the resultant boiled rice is free from unevenness and has a substantially improved taste.

Further, in the above-mentioned embodiment, the pot 5 is contained in the inner case 3 with the heating space 7 interposed, so that it requires no such close dimensional accuracy as is expected of the prior art pot which is to be brought in close contact with a hot plate. Thus, the electric rice cooker of the invention ensures great ease of processing as well as substantial reduction in cost of production. Furthermore, it is easy to handle because it is not subject to any substantial change in heat conduction attributable to deformation, corrosion, etc.

Figure 6:
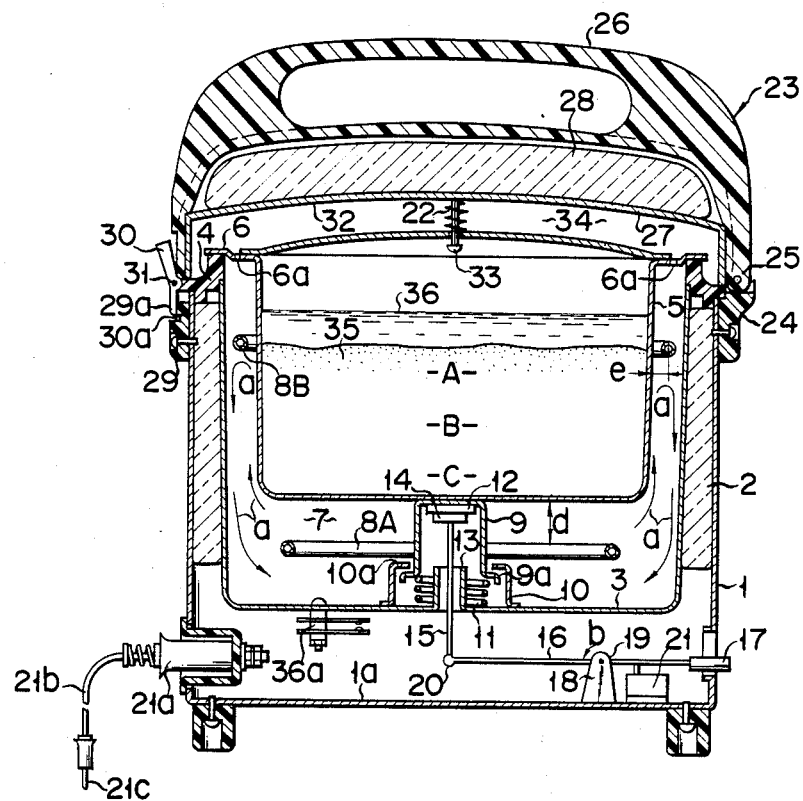
FIG. 6 is a sectional view of an electric rice cooker according to another embodiment of the invention.
Figure 7:
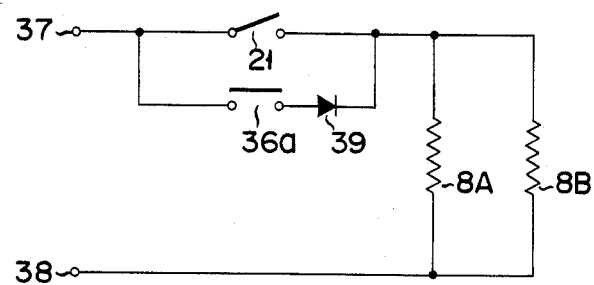
FIG. 7 is a wiring diagram of the electric rice cooker of FIG. 6.

Referring now to FIGS. 6, 7 and 8, there will be described another embodiment of the invention. The electric rice cooker of this embodiment, unlike the one shown in FIG. 1, is provided with two sheath heaters 8A and 8B disposed in the heating space 7 as well as with a means for keeping rice in the pot 5 warm. In FIG. 6 like reference numerals refer to the same parts or members as shown in FIG. 1.

In the drawing of FIG. 6, the ring-shaped sheat heaters 8A and 8B which are arranged in the heating space 7 at distances from the pot 5 and the inner case 3 are 400 W and 200 W heaters respectively. The sheath heater 8A, which has a diameter a little smaller than the outside diameter of the pot 5, is supported by a suitable support member (not shown) at a distance d from the outer bottom face of the pot 5, while the sheath heater 8B is supported by another suitable member (not shown) at a distance e from the outer peripheral surface of the pot and at a fixed distance from the outer bottom face of the pot 5, surrounding the outer periphery of the pot 5.

The flange 6 on the top edge of the pot 5 in FIG. 6 is provided with a plurality of air holes 6a. When the outer lid 23 is shut down, an upper space 34 is defined between the inside cover 27 and the inner lid 32 of the pot 5, the air holes 6a connecting the upper space 34 with the upper end portion of the heating space 7. Numeral 36a designates a temperature sensing means or bimetal switch attached to the outer bottom face of the inner case 3, which is so designed as to operate at a suitably selected operating temperature, e.g. around 70° C.

FIG. 7 shows a circuit diagram of the electric rice cooker according to the embodiment as illustrated by FIG. 6. The microswitch 21 and a parallel circuit of the sheath heaters 8A and 8B are connected in series between source terminals 37 and 38, the microswitch 21 being connected in parallel with a series circuit of the bimetal switch 36a and a diode 39 used as a half-wave rectifier.

Now there will be described the operation of the electric rice cooker as shown in FIGS. 6 and 7. In this case, the cooking materials or rice and water are put in the pot 5, the sheath heaters 8A and 8B are connected to the power supply, and thereafter the same operations for the electric rice cooker of FIG. 1 are followed until the rice cooking is finished. At the initial stage of the operation, however, the bimetal switch 36a is closed because the temperature of the inner case 3 is lower than the operating temperature of the switch 36a, which, though, will not cause any special effect, since the microswitch 21 is already closed. When the temperature of the inner case 3 rises and exceeds the operating temperature, the microswitch 36a opens. This will not, however, effect the power supply to the sheath heaters 8A and 8B, since the microswitch 21 connected in parallel with the switch 37 is again closed. When the rice cooking is completed after the passage of a time in this state and the pot 5 is subjected to dried-up boiling, the microswitch 21 is opened as described in connection with FIG. 1. At this time, as may be clear from the above description, the bimetal switch 36a is also opened, so that the power supply to the sheath heaters 8A and 8B is interrupted and the pot 5 and hence the inner case 3 are gradually cooled.

When the inner case 3 is cooled below the operating temperature (set at approx. 70° C. in this case) of the bimetal switch 36a, the switch 36a is closed, and the sheath heaters 8A and 8B are supplied with electric power which has been subjected to half-wave rectification by means of the diode 39, producing heat far smaller than the heat produced during the cooking time. Such heat is applied to the air inside the heating space 7 so as to keep the pot 5 at a suitable temperature. Part of the heated air in the heating space 7 is introduced into the upper space 34 through the air holes 6a, and heats the pot 5 from above, thereby preventing dewdrops from sticking to the inner lid 32.

When the temperature of the pot 5 and hence of the inner case 3 reaches the operating temperature of the bimetal switch 36a, the bimetal 36a opens to interrupt the power supply to the sheath heaters 8A and 8B, and the pot 5 again begins to be cooled. Further, when the temperature of the inner case 3 is lowered below the operating temperature of the bimetal switch 36a, the switch 36a is again closed. Thus, the rice in the pot 5 may be kept at a suitable temperature.

Since the diode 39, among other components as shown in the circuit diagram of FIG. 7, is attached to a suitable portion of the outer case 1, it may be natural to draw the diode 39 and the electric wiring to connect these components in FIG. 6 in accordance with FIG. 7. However, the diode 40 is of the well-known specifications, so that it is excluded from the illustration in FIG. 6 for the simplicity of the drawing. This also applies to the case of FIG. 1.

FIG. 8 shows curves which indicate how the temperatures at points A, B and C in the pot 5 as shown in FIG. 6 vary when the rice cooking and warmth keeping operations are performed by using the electric rice cooker of FIG. 6. The graph is divided in the same manner with the graph of FIG. 5. In this case, A, B and C indicate the upper, intermediate, and lower portions of the rice in the pot 5, respectively, as shown in FIG. 6. FIG. 8 indicates that the temperature of the rice rises in the order of the portions A, B and C approximately 5 minutes after the start of power supply to the sheath heaters 8A and 8B at time O, and that it reaches nearly 100° C. after 20 minutes of heating. When the rice cooking operation is finished, the microswitch 21 is opened, and thereafter the temperature at each of the portions A, B and C may be kept at a fixed level of approximately 70° C., according to FIG. 8. Lines extending substantially in parallel with the time axis to indicate the warmth keeping condition show the temperatures at the portions A and C alone. In this section of the graph, a line corresponding to the portion B, which is to be drawn between the two lines as shown, is omitted for simplicity, since these lines for the portions A, B and C are in close vicinity to one another.

The electric rice cooker may be switched over to the "keeping warm" state in the aforesaid manner. As may be seen from the heating system of the electric rice cooker of this embodiment as well as from the measurement results of FIG. 8, warmth keeping for the pot 5 is performed in such a state that the temperature at the upper portion of the pot 5 is a little higher than that at the lower portion. It is known that, in keeping the warmth of boiled rice, heating of the upper portion of the pot 5 would not change the taste of the rice even after a relatively long interval from the completion of cooking. Therefore, it may be understood that the warmth keeping as well as the rice cooking may be achieved under highly desirable conditions by using the electric rice cooker of this embodiment.

Although two sheath heaters are used in the above embodiment, a single sheath heater may be suitably used for the purpose. What is essential is to arrange the sheath heater or heaters at fixed distances from the pot 5 and the inner case 3 so that the temperature at the upper portion of the pot 5 may rise ahead of that at the lower portion. Meanwhile, in this embodiment, the sheath heaters 8A and 8B are supplied with electric power subjected to half-wave rectification. Instead of doing this, however, an exclusive heater for warmth keeping may be disposed outside the pot 5 and connected in series with the diode 39 as shown in FIG. 7 so that the sheath heaters 8A and 8B may be connected in series with such exclusive-use heater at the warmth keeping operation, thereby performing the heating for warmth.

What we claim is:

1. A method of cooking rice under substantially atmospheric pressure, comprising the steps of:

placing a mixture of water and rice in a pot; and heating said mixture of water and rice, while forming by convection heating within said mixture a temperature gradient which enables an upper portion of said mixture to have a temperature higher than that of a lower portion of said mixture, with a substantially ring shaped sheath electrical heater separated from the bottom of the pot and disposed in an airspace between said pot and a case which together form a continuous substantially sealed heating space, so that the upper portion of said mixture reaches an optimal cooking temperature range in a shorter time than the lower portion of said mixture, by said convection heating, and forms a mixture layer kept within the optimal cooking temperature range, the rice located in the mixture layer absorbs more water than the rice located in the other regions, causing the surface of the water within said pot to gradually lower toward the bottom of said pot, and consequently the mixture layer gradually lowers, and while the mixture layer gradually lowers, and while the mixture layer gradually lowers, the rice located in each region in said pot remains within the optimal cooking temperature range for substantially the same length of time, whereby the rice in the pot uniformly absorbs the water independent of position within said pot.

2. A method of cooking rice under substantially atmospheric pressure comprising the steps of:

placing a mixture of water and rice in a pot having a peripheral wall and a bottom having an outer edge connected to said peripheral wall, said pot being made of a material that conducts heat well, said pot being contained and supported by a case, said pot and said case defining a continuous, substantially sealed heating space betwen said case and said pot; and heating air in said heating sapce by convection heating using a substantially ring-shaped sheath heater separated from the bottom of the pot while forming and maintaining within said mixture a temperature gradient which enables an upper portion of said mixture to have a temperature higher than that of a lower portion of said mixture, so that the upper portion of said mixture reaches an optimal cooking temperature range in a shorter time than the lower portion of said mixture, by said convection heating, and forms a mixture layer kept within the optimal cooking temperature range, the rice located in the mixture layer absorbs more water than the rice located in the other regions, causing the surface of the water within said pot to gradually lower toward the bottom of said pot, and consequently the mixture layer gradually lowers, and while the mixture layer gradually lowers, the rice located in each region in said pot remains within the optimal cooking temperature range for substantially the same length of time, whereby the rice in the pot uniformly absorbs the water independent of the position within said pot.

3. A method as in claim 2 wherein said heating and maintaining step includes the step of heating air in said heating step and maintaining said temperature gradient with the electric heater located between and separated from said pot and inner case in the vicinity of and following the circumference of said bottom outer edge.

* * * * *